Patented Oct. 6, 1925.

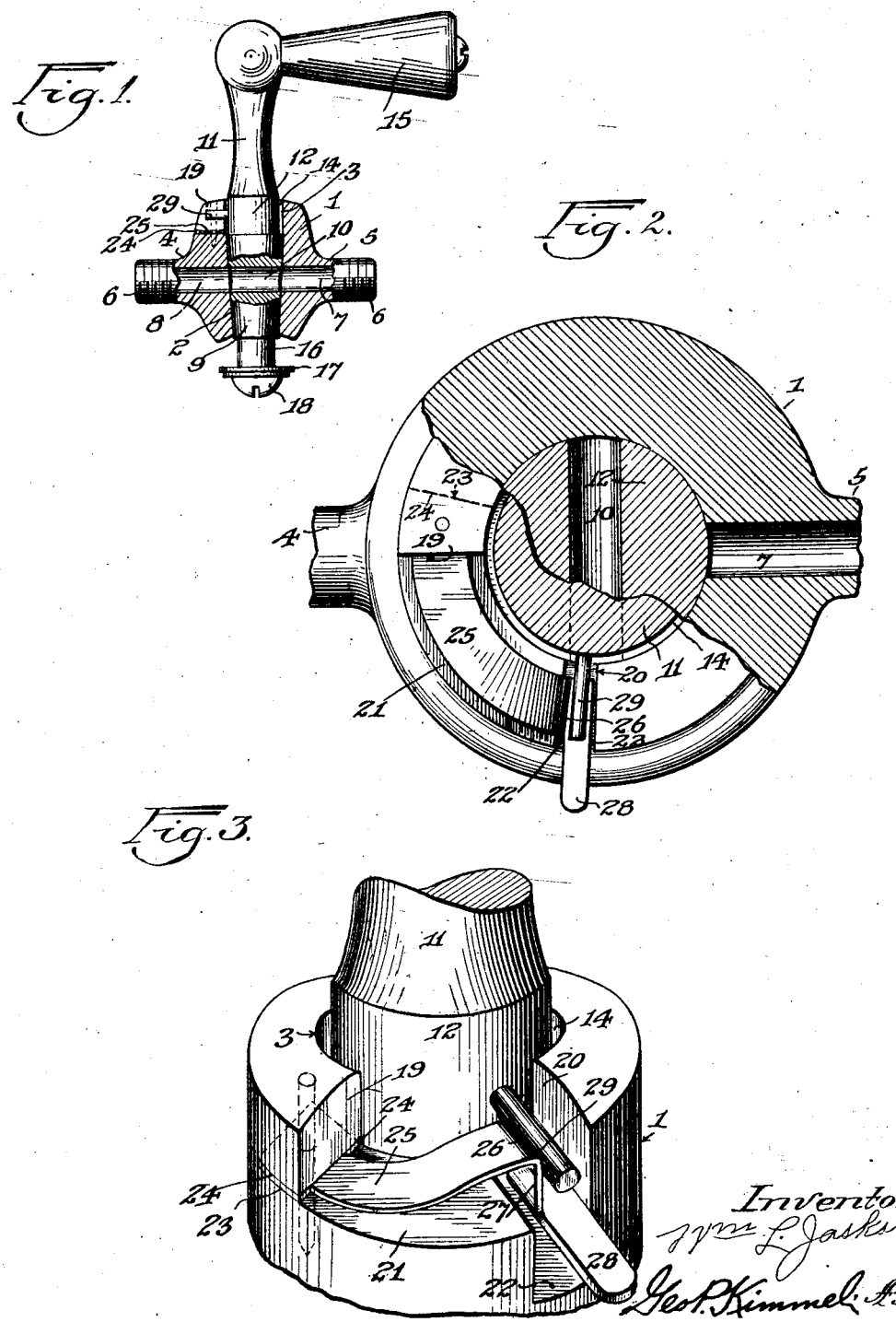

1,556,443

UNITED STATES PATENT OFFICE.

WILLIAM L. JACKSON, OF CHICAGO, ILLINOIS.

SAFETY GAS COCK.

Application filed December 20, 1924. Serial No. 757,287.

*To all whom it may concern:*

Be it known that I, WILLIAM L. JACKSON, a citizen of the United States, residing at Chicago, in the county of Cook and State of Illinois, have invented certain new and useful Improvements in Safety Gas Cocks, of which the following is a specification.

This invention relates to a safety gas cock, designed primarily for use in connection with gas stoves and ranges, but it is to be understood that a safety cock, in accordance with this invention, can be employed for any purposes for which it is found applicable, and the invention has for its object to provide in a manner as hereinafter set forth, a gas cock provided with means for automatically locking the same when shifted to shut-off position, thereby preventing the accidental or unwarranted shifting of the valve plug from such position to turn on the gas, under such conditions preventing gas leakage or waste and further over-coming gas explosions.

Further objects of the invention are to provide, in a manner as hereinafter set forth, a safety gas cock which is simple in its construction and arrangement, strong, durable, compact, thoroughly efficient and convenient in its use, readily assembled and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding members throughout the several views—

Figure 1 is a sectional elevation of a safety cock in accordance with this invention and with the cock shown in open position.

Figure 2 is a sectional plan of the cock and with the latter shown in the closed or locked position.

Figure 3 is a fragmentary view in perspective of a safety cock in accordance with this invention in closed position.

Referring to the drawings in detail, the housing for the valve plug is indicated at 1 and is formed with a central bore consisting of a tapered part 2 and a cylindrical part 3. The tapered part 2 is of materially greater length than the cylindrical part 3 and the latter is arranged at one end of the bore. The housing 1 is provided with a pair of oppositely extending nipples 4, 5 employed for detachably connecting it in position and each of said nipples are peripherally threaded as at 6, whereby said nipples can threadably engage with a union not shown, or with the pipe line sections, not shown. The nipples 4, 5 are positioned in a plane intersecting the bore intermediate the ends thereof. The housing 1 is formed with a pair of oppositely extending ports 7, 8 which are of a length to extend from the central bore of the housing to the free ends of the nipples 4, 5.

The part 2 of the central bore has mounted therein a tapered valve plug 9 provided with a passage 10 adapted to register with the ports 7 and 8 to provide for a supply of gas for consumption. When the passage 10 is shifted clear of the ports 7 and 8 the gas supply is shut off.

Formed integral with the enlarged end of the plug 9 is a stem comprising a curvilinear part 11 and a cylindrical part 12 and the latter merges into the enlarged end of the plug 9 and is arranged within the cylindrical part 3 of the plug bore. The diameter of the cylindrical part 12, of the plug stem, is less than the diameter of the part 3 of the central bore thereby forming a clearance 14 between the wall of said central bore and said part 12. The curvilinear part 11 of the plug stem is provided with a handle member 15, to facilitate the shifting of the plug 9 and said handle member 15 is disposed at right angles with respect to the plug stem. The smaller end of the valve plug 9 is formed with a reduced extension 16, which is clear of the housing 1 and carries suitable washer elements 17 secured in a position by a headed holdfast device 18 which engages with the extension 16. The washer elements prevent leakage and also an upward shift of the valve plug. The diameter of the plug 9 throughout is such as to snugly fit the wall of the tapered part of the central bore of the housing 1, but the fit is such as not to prevent the turning of the plug 9, when occasion requires. The fit is also such as to prevent leakage.

The housing 1 is cut away, at one side, to provide a pair of spaced radial shoulders or abutments 19, 20 which constitute stops for limiting, respectively, the opening and closing movements of the plug 9. The cutting away of the housing 1, also provides a concentric ledge 21, and the housing 1 is furthermore cut away to provide a diametrically extending groove 22 positioned at one end of and arranged below the ledge 21. One of the walls of the groove 22 forms a continuation of the shoulder 20.

The housing 1 is furthermore formed with a concentrically disposed pocket 23 which opens at the lower end of the shoulder 19 and has its lower wall forming a continuation of the ledge 21. Positioned within the pocket 23, as well as being flushed with the inner and outer faces of the housing 1, and also with the shoulder 19, is a rectangular head 24 of a concentrically disposed locking member which not only includes the head 24, but also a segment-shaped resilient arm 25, having an upwardly extending inclined portion 26 which merges into a vertically disposed depending portion 27, the latter terminating in an actuating finger bar 28 which is arranged within and projects outwardly from the groove 22. The bar 28 has its upper face disposed at right angles with respect to the depending portion 27. The arm 26, as well as the portion 27, is narrower than ledge 21. The arm 25 is so constructed as to maintain the bar 28 in an elevated position in the groove 22 so that the depending portion 27, which constitutes a radially extending latch, will be arranged in the path of a locking pin 29, which is secured to and projects radially from the part 12 of the plug stem.

As shown in Figure 3 the cock is in closed position and the pin 29 is in engagement with the depending portion 27. When the pin 29 is in the position shown in Figure 3, the plug stem can not be shifted to move the plug 9 to open position and to enable plug 9 to move to open position, the finger bar 28 is depressed so that the portion 26 of the arm 25 will be moved below the pin 29, and the plug 9 can then be shifted to open position. As the plug 9 is shifted to open position the pin rides on the arm 25 depressing same and the engagement of the pin 29 with arm 25 acts as a frictional lock to prevent accidental shifting of plug 9 when it is set at any point between fully closed and fully open position. When the plug 9 is shifted to shut-off position, the pin 29 rides upon the arm 25, depressing the same, until the pin 29 clears the upper end of the portion 26 of the arm 25, whereby the latter will be released and the end portion 26 will spring upwardly so that the portion 27 will be arranged in the path of the pin 29 thereby locking the plug 9 in closed position. The construction as set forth will provide for the automatic locking of the plug 9 in shut-off position, and furthermore will prevent the accidental shifting of the plug from such position to over-come the turning on of the gas when not necessary, thereby preventing gas leakage and waste.

It is thought that the many advantages of a safety gas cock, in accordance with this invention, can be readily understood, and although the preferred embodiment of the invention is as illustrated and described, yet it is to be understood that changes in the details of construction can be had which will fall within the scope of the invention as claimed.

What I claim is:—

1. A safety cock comprising a plug stem and housing therefor, a shiftable pin projecting radially from the plug stem into the plug housing, and a resilient depressible locking member disposed within plug housing concentrically with respect to the plug and anchored at one end in the plug housing, said member having its other end provided with a stop positioned within the plug housing and normally arranged in the path of said pin to arrest the movement thereof in one direction, and said member further having means projecting radially from the plug housing and arranged below the pin to permit of lowering said stop to release said pin.

2. A safety cock comprising a shiftable plug, a plug housing cut away to form a pair of spaced shoulders, a concentric ledge therebetween and a groove at one end of and below the ledge, a pin projecting radially from the plug stem and shifting between the said shoulders on the opening and closing movement of the plug, and a resilient depressible locking member arranged within and anchored at one end in the plug housing and having its other end free, said member projecting from one of said shoulders and extending in an upward direction toward the other of said shoulders, said member having its free end provided with a stop depending into said groove and normally arranged in the path of said pin to arrest movement of the latter in one direction and said member further provided with a finger bar carried by the said stop, vertically movable in said groove to lower the stop to release the pin and projecting outwardly from said housing.

3. A safety cock comprising a shiftable plug, a plug housing having a cut out portion at its top to provide a pair of shoulders, the bottom of said cut out portion cut away to provide a diametrically disposed groove in said housing, a pin projecting radially from the plug stem and operating in said cut out portion between said shoulders, a depressible resilient locking member carried by the housing within said cut out portion and arranged above the bottom of the latter and further extending over said groove, said member having means shiftable in said groove and normally arranged in the path of said pin to provide a stop to arrest shifting movement of the plug stem, and said member further provided with a shifting finger therefor, said finger arranged in said groove and projecting radially from said housing.

4. A safety cock comprising a shiftable plug, a plug housing having a cut out portion at its top to provide a pair of shoulders, the bottom of said cut out portion cut away to provide a diametrically disposed groove in said housing, a pin projecting radially from the plug stem and operating in said cut out portion between said shoulders, a depressible resilient locking member carried by the housing within said cut out portion and arranged above the bottom of the latter and further extending over said groove, said member having means shiftable in said groove and normally arranged in the path of said pin to provide a stop to arrest shifting movement of the plug stem, said member being concentrically disposed within the housing with respect to the plug stem, and said member further provided with a shifting finger therefor, said finger arranged in said groove and projecting radially from said housing.

5. A safety cock comprising a shiftable plug, a plug housing having a cut out portion at its top to provide a pair of shoulders, the bottom of said cut out portion cut away to provide a diametrically disposed groove in said housing, a pin projecting radially from the plug stem and operating in said cut out portion between said shoulders, a depressible resilient locking member carried by the housing within said cut out portion and arranged above the bottom of the latter and further extending over said groove, said member having means shiftable in said groove and normally arranged in the path of said pin to provide a stop to arrest shifting movement of the plug stem, said finger arranged in said groove and projecting radially from said housing, and said pin normally arranged in superposed relation with respect to said finger.

6. A safety cock comprising a shiftable plug, a plug housing having a cut out portion at its top to provide a pair of shoulders, the bottom of said cut out portion cut away to provide a diametrically disposed groove in said housing, a pin projecting radially from the plug stem and operating in said cut out portion between said shoulders, a depressible resilient locking member carried by the housing within said cut out portion and arranged above the bottom of the latter and further extending over said groove, said member having means shiftable in said groove and normally arranged in the path of said pin to provide a stop to arrest shifting movement of the plug stem, said member being concentrically disposed within the housing with respect to the plug stem, said member further provided with a shifting finger therefor, said finger arranged in said groove and projecting radially from said housing, and said pin normally arranged in superposed relation with respect to said finger.

In testimony whereof, I affix my signature hereto.

WILLIAM L. JACKSON.